Nov. 4, 1969  J. A. CURRY  3,476,467

EYEGLASS TEMPLES HAVING ADJUSTABLE EAR-ENGAGING BARS

Filed March 25, 1965

INVENTOR.

BY *Jack A. Curry*

United States Patent Office 3,476,467
Patented Nov. 4, 1969

3,476,467
EYEGLASS TEMPLES HAVING ADJUSTABLE EAR-ENGAGING BARS
Jack A. Curry, P.O. Box 833, Riverside Station, Miami, Fla. 33135
Filed Mar. 25, 1965, Ser. No. 442,633
Int. Cl. G02c 5/14, 5/20, 5/22
U.S. Cl. 351—123                          5 Claims

ABSTRACT OF THE DISCLOSURE

Eyeglass temples have an adjustable ear-engaging bar which can be slid along a track way or groove built into the temple piece, and can be pivoted from a position of use normal to the temple piece to a stored position parallel to the temple piece.

---

This invention relates generally to eyeglass and particularly to improvements on the eyeglass frame temple pieces.

Many present day eyeglass frame temples fail to retain the nose pieces in position on the bridge of a user's nose and/or the rear or teminal ends of the temple pieces tend to rise or lift when a wearer is excercising, bending forward, etc.

Primary objects of the present invention are to provide an improved temple piece construction for preventing eyeglass frames from slipping; more particularly to provide an attachment supplementing the normal action of the temple pieces of eyeglass frames in which the attachments are pivotal from a stored position in the plane of the temple pieces to an operative position substantially normal to the longitudinal axis of the temple pieces, and/or which are adjustable along the length of the temple pieces.

These together with other and more specific objects and advantages will become apparent from a consideration of the following description when taken in conjunction with the drawing forming a part thereof, in which.

Figure 1:
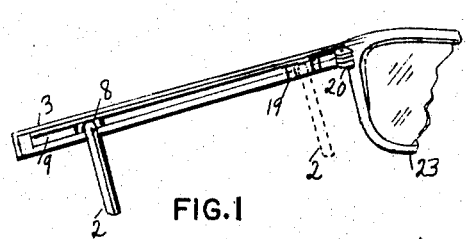
FIG. 1 is a fragmentary perspective view showing a temple piece incorporating the invention, and showing by dotted lines an alternative, adjusted position of an ear-engaging abutment.

In FIG. 1, an eyeglass frame 23 has hingedly mounted by a conventional hinge assembly 20 a laterally pivotable temple piece 3. The temple piece 3 is formed with a longitudinally extending groove or track which opens inwardly i.e. toward the wearer's face (see FIG. 3) and the groove or track 9 is undercut as seen in FIG. 2.

An ear engaging abutment bar 2 has formed integrally or as a two-piece assembly, a lateral cam element 8 which is reciprocatively and pivotally received in the groove or track 9. The cam element 8 includes diametrically opposed rounded corners 8' and right-angular or sharp corners 8". The bar 2 can be pivoted 90°, counterclockwise from the position seen in FIG. 2, and thus stored in longitudinal alignment with the temple piece 3. When rotated clockwise to the position shown in FIGS. 1–3, the sharp corners 8" will dig into the undercut portions of the groove 9.

Figure 3:
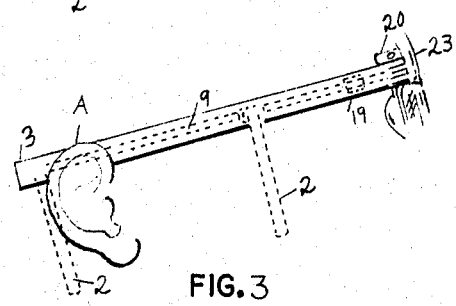
FIG. 3 is a fragmentary side elevational view showing the temple piece in position behind a user's ear.

As seen in FIG. 3, the bar tends to pivot clockwise, when engaging ear A, and the sharp corners 8" will bite into the temple 3 thereby retaining the bar 2 in an adjusted position. The rounded corners 8' permit the plate or cam 8 to be rotated so that longitudinal adjustment can be accomplished. The temple piece 3 includes, adjacent the hinge assembly 20, an opening 19 communicating with track 9 and permitting the abutment bar 2 to be removed bodily from the temple piece.

Figure 2:
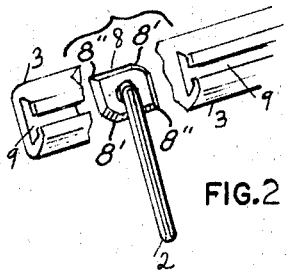
FIG. 2 is an enlarged fragmentary perspective view showing details of a portion of FIG. 1.
Figure 4:
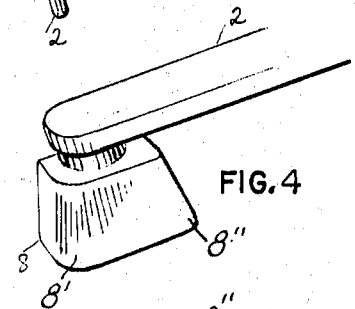
FIG. 4 is an enlarged fragmentary view of an alternate form of the ear-engaging abutment bar removed from a temple piece.

The bar and cam of FIGS. 1–3 can be produced as a two-piece assembly, or as shown in FIG. 4, the assembly can be molded as a one-piece element having the functional and structural characteristics of the previously described embodiment.

Figure 5:
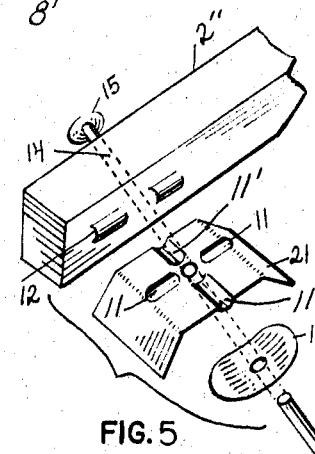
FIG. 5 is an exploded perspective view of another form of ear-engaging abutment bar.

Referring to FIG. 5, a fragmentary portion of an alternate of abutment bar is shown removed from the previously described, undercut groove or track. In this embodiment, the abutment bar is indicated as 2" and includes a structure which replaces the previously described cam structure. The bar 2" has projecting from one side thereof integral projections 12 which are generally semi-cylindrical and extend along the longitudinal axis of the bar 2". A mounting plate 21 is reciprocatively received in the previously described track 9 of a temple piece, and includes right angularly related pairs of detents or notches 11 and 11". The plate 21 is centrally apertured and receives therethrough a mounting pin 14 having an integral head and a bowed washer 13 engages the plate 21, and the pin 14 is peened over at 15.

When the plate 21 is disposed in the track 9, the projections 12 will engage notches 11' and the bar 2" will be disposed parallel to the temple piece, and when the bar 2" is turned 90° on the pin 14 and the enlargements 12 engage notches 11, the bar 2" will be at approximately right angles to the temple piece and in an operative position.

Figure 6:
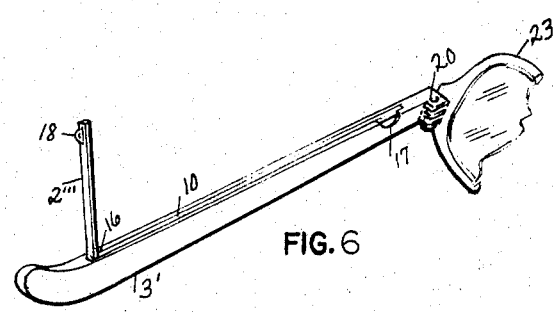
FIG. 6 is a fragmentary perspective view, looking at the underside of an eyeglass temple piece, and illustrating another embodiment of the invention.
Figure 7:
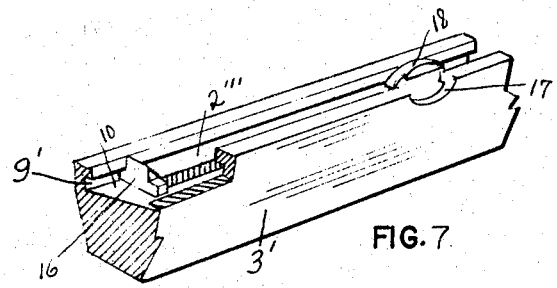
FIG. 7 is an enlarged fragmentary perspective view showing the embodiment of FIG. 6 in a "stored" condition.
Figure 8:
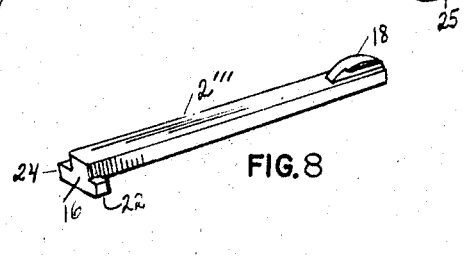
FIG. 8 is a perspective view of the ear-engaging abutment bar of FIG. 6, removed from the temple-piece.
Figure 9:
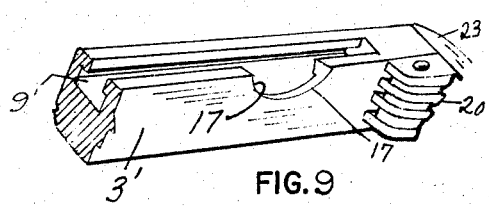
FIG. 9 is an enlarged, fragmentary perspective view of the eyeglass temple-piece from which the element of FIG. 8 was removed.

Considering FIGS. 6–9, in FIG. 6, a portion of an eyeglass frame 23 has hinged at 20 a temple piece 3' and the underside of the temple piece is shown in this view. The temple piece 3' includes a downwardly opening, undercut groove or track 9' as seen in FIGS. 7 and 9, and adjacent the hinge and communicating with track 9' is a lateral notch 17.

Reciprocatively supported in track 9' is an abutment bar 2''' which has a lateral lip 18 at one end, and a transverse, square cross sectioned shaft 16 which is reciprocatively received in track 9'.

The bar 2''' will be stored within the groove 9'; see FIG. 7, and may be lifted out of the groove 9' by a fingernail inserted in notch 17 beneath lip 18 whereby the bar 2''' will depend at right angles from the temple piece 3' as seen in FIG. 6.

Although the embodiments of FIGS. 1–4, 5 and 6–9 all pivot relative to the longitudinal axis of the temple pieces upon which they are mounted, in the embodiments of FIGS. 1–4 and 5, the track or groove opens laterally toward a wearer's face or cheek, while the embodiment of FIGS. 6–9, the abutment bar pivots downwardly from the temple piece.

What is claimed is:
1. In an eyeglass frame including temple pieces hinged- ly pivoted for lateral movement with respect to the frame, the improvement comprising:

each temple piece having an elongated, undercut groove extending substantially the length of said temple piece; and an ear-engaging abutment bar having a portion substantially conforming to said undercut groove and reciprocatively retained in said groove, said portion being slidable within said groove along the temple piece, said abutment bar including an ear-engaging element pivotable relative to said groove from a stored position in substantial longitudinal alignment with said temple piece to a position substantially normal to said temple piece, and stop means to prevent said bar from pivoting more than approximately ninety degrees from the stored position.

2. The structure as claimed in claim 1 in which said portion of the abutment bar includes a cam plate of substantially rectangular configuration and said element pivotable relative to said groove depends laterally from said plate and at one side thereof, one diagonally opposed pair of corners of said plate being rounded to allow pivoting of said abutment bar, and the other pair of corners being angular for biting engagement with the walls of said slot when the abutment bar is substantially normal to said temple piece.

3. The structure as claimed in claim 1 in which said portion of the abutment bar includes a mounting plate reciprocatively retained in said groove, a pivot shaft extending through said plate, a spring plate mounted on said shaft and engaging said plate, said bar element and mounting plate respectively including cooperating projections and detent portions disposed in right angular relationship for orienting said bar element in either right angles to said temple piece or generally parallel to the longitudinal axis thereof.

4. The structure as claimed in claim 1 in which said temple piece includes a notch portion communicating with said groove portion and permitting said abutment bar to be removed bodily from said temple piece.

5. The structure as claimed in claim 1 in which said groove opens into a lower edge portion of said temple piece, said abutment bar including a transverse pivot pin at one end and reciprocatively received in said undercut groove portion, the bar element being pivotable into said groove portion into the lower edge of said temple piece when pivoted into the longitudinal axis thereof.

References Cited

UNITED STATES PATENTS

| | | | |
|---|---|---|---|
| 444,505 | 1/1891 | Price | 351—118 |
| 2,626,538 | 1/1953 | Frum | 351—123 |
| 2,797,617 | 7/1957 | Ring | 351—118 |

DAVID SCHONBERG, Primary Examiner

J. W. LEONARD, Assistant Examiner

U.S. Cl. X.R.

351—118, 153